United States Patent [19]

Naylor

[11] 4,064,329
[45] Dec. 20, 1977

[54] CELL SEALING MEANS

[75] Inventor: Denis Naylor, Crawley, England

[73] Assignee: Mallory Batteries Ltd., Crawley, England

[21] Appl. No.: 598,487

[22] Filed: July 23, 1975

[30] Foreign Application Priority Data

July 29, 1974 United Kingdom ............... 33441/74

[51] Int. Cl.² ............................................. H01M 2/08
[52] U.S. Cl. ................................................. 429/174
[58] Field of Search ....................... 136/179, 107, 133; 429/86, 174, 185

[56] References Cited

U.S. PATENT DOCUMENTS

| | | | |
|---|---|---|---|
| 2,705,249 | 3/1955 | Ellis | 136/133 |
| 2,816,153 | 12/1957 | Kort | 429/86 |
| 3,310,436 | 3/1967 | Ralston et al. | 136/107 |
| 3,442,716 | 5/1969 | Muraki et al. | 136/133 |
| 3,457,117 | 7/1969 | Angelovich | 429/174 |
| 3,904,438 | 9/1975 | Naylor et al. | 136/133 |

*Primary Examiner*—Donald L. Walton
*Attorney, Agent, or Firm*—Ronald S. Cornell; Israel Nissenbaum; Charles W. Hoffmann

[57] ABSTRACT

A sealing means for an electrochemical cell containing electrolyte, the sealing means including a body of material capable of absorbing electrolyte and thereby helping to minimize electrolyte leakage from the cell.

7 Claims, 2 Drawing Figures

CELL SEALING MEANS

The invention relates to electrochemical cells of the alkaline type.

More particularly, the invention relates to a sealing means for an electrochemical cell to help minimize leakage of alkaline electrolytes over long periods of time. Electrolyte of sealed alkaline cells tends to slowly find its way through a seal area and appear as a white incrustation on the outside of the cell.

Existing alkaline cells have a metal top closure member encircled by a resilient sealing grommet, made for example of plastic material. The electrolyte tends to leak along a path extending between the grommet and the top closure member.

According to the present invention, in a sealed electrical cell in which a leakage path for electrolyte is present, a body of material capable of absorbing the electrolyte is placed in the leakage path.

More specifically, in the case of a sealed alkaline cell of the construction mentioned above, the absorbent material is preferably placed between the top closure member and the sealing grommet, and may e.g. be a ring or tube of absorbent material.

The incorporation of the absorbent material in the leakage path has been found to increase the time taken for electrolyte to reach the outside of the cell.

Preferably, to minimize electrolyte leakage between the grommet and the container of the cell, a high-pressure compression area is created by providing an external projection on the grommet, as disclosed in U.S. Pat. No. 3,904,438.

An alkaline cell embodying the present invention is shown in the drawings accompanying the specification, in which.

Figure 1:
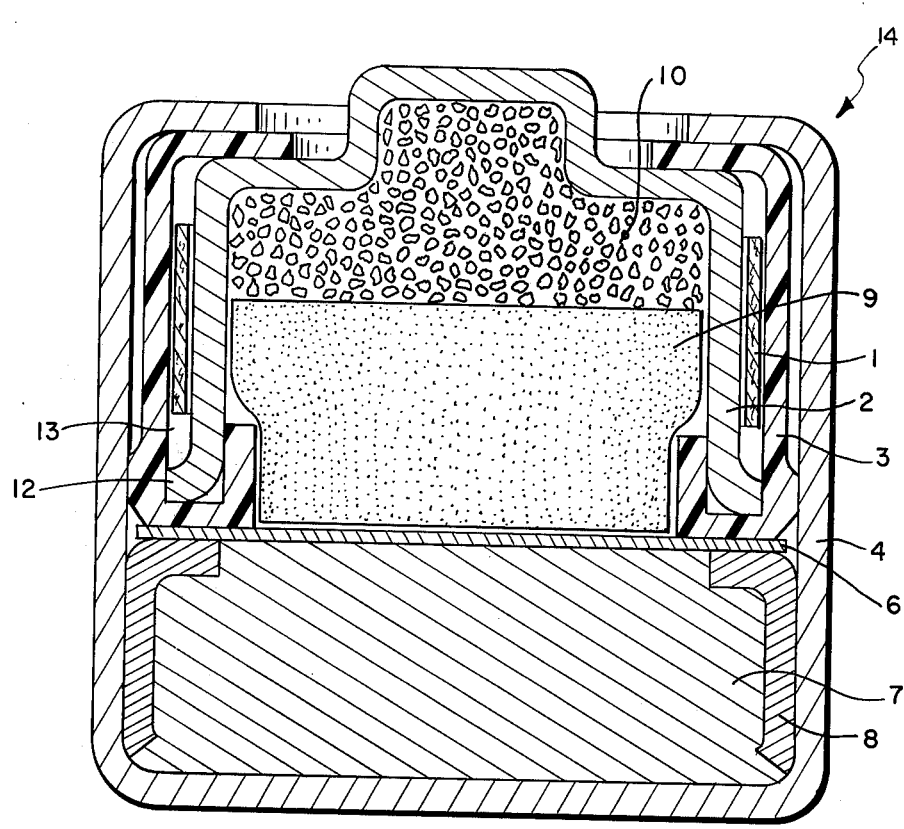
FIG. 1 is a cross section of the cell.
Figure 2:
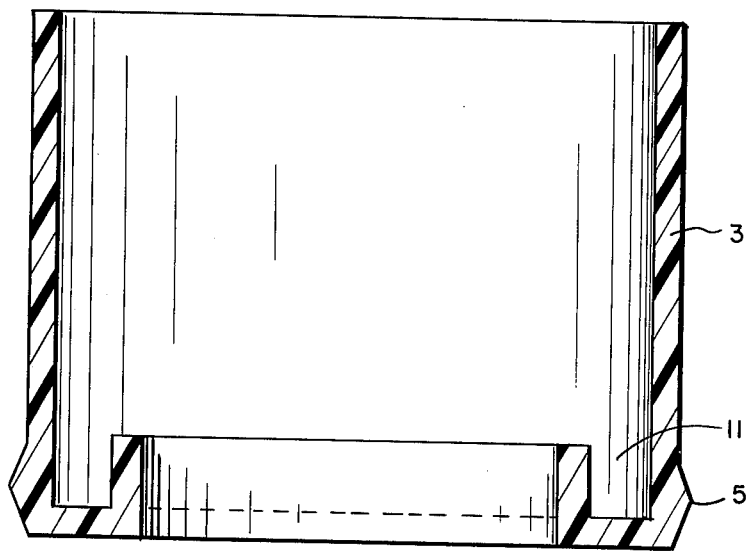
FIG. 2 is a cross section of the sealing grommet of the cell.

The cell 14 has a metal container 4 with an open end, a top closure member 2 which is cup-shaped and is pressed from metal sheet or strip and in the open end of the container, and a plastic sealing grommet or sleeve 3 trapped between the outside of the top closure member and the inside of the container 4. In the lower part of the cell 14 is a depolarizing cathode 7 consolidated into the container 4 within a support sleeve 8 and covered by a barrier disc 6. In the upper region of the cell 14, inside the cup-shaped top closure member 2, are anode material 10 and an absorbent body 9 containing mobile or fluid electrolyte of the cell, in contact with the barrier disc 6. At least the inner surfaces of the cell container 4 and top closure member 2 are electrochemically compatible with the cell constituents with which they are in contact.

The sealing grommet 3 has at its lower end an internal channel 11 which accommodates the encircled edge of the top closure member 2. The top closure member 2 has an outwardly directed edge flange 12. On the outer surface of the grommet 3, in a position aligned with the outwardly directed flange 12 of the top closure member 2, is a resilient annular projection 5 whose external diameter is greater than the internal diameter of the container 4. Consequently, insertion of the top closure member 2 and grommet 3 into the container 4 causes the region of the resilient projection 5 to be highly compressed between the flange 12 and the internal surface of the container 4, as described in U.S. Pat. No. 3,904,438. The high local compression of the grommet 3 at the resilient projection 5 helps ensure that seepage of electrolyte will preferentially follow a path round the edge of the top closure member 2, and between the top closure member and the interior of the sealing grommet 3. An annular space 13 exists between the grommet 3 and the top closure member 2 and this accommodates a tube 1 of material capable of absorbing mobile or fluid electrolyte. The absorbent material is preferably a wound tube of chemically inactive bibulous paper.

The cell 14 is sealed by crimping or rolling the upper edge of the container 4 so as to compress the upper edge region of the sealing grommet 3 between the deformed edge of the container and the top closure member 2.

It is to be noted that the cell is shown much larger than actual size, the invention being directed primarily (but not exclusively) to miniature alkaline cells.

The concepts are applicable to electrical devices other than electrical cells. Such other devices include electrolytic capacitors.

What is claimed is:

1. An electrical device comprising a container with an opening in one end thereof; a mobile fluid electrolyte in said container; a single top closure member at the open end of the container said closure member extending for a substantial distance within said container in spaced relation thereto; a resilient sealing grommet in spaced relation to and encircling the closure member to form an enclosed annular space between said grommet and said closure member; said sealing grommet being compressed between said closure member and the inner wall of said container at the upper end of said grommet to complete the closing of the open end of said container; whereby two potential electrolyte leakage paths exist, a first path between said grommet and said closure member which includes said annular space and a second between said grommet and the interior of said container; means to inhibit electrolyte leakage along said second path between said grommet and the interior of said container whereby electrolyte leakage is directed to said first path between said grommet and said closure member; and said first path having contained therein, in said annular space, a body of non-reactive material capable of absorbing said electrolyte.

2. The electrical device of claim 1 wherein said electrolyte leakage inhilution means comprises an external resilient annular projection on said grommet compressed between an outwardly directed flange on said closure member and the internal surface of said container.

3. The electrical device of claim 1 wherein said device is an electrical cell.

4. The device cell of claim 3, wherein the absorbent material is in the form of a ring or tube.

5. The device of claim 3, wherein the absorbent material includes bibulous paper.

6. The electrical device of claim 3 wherein said electrolyte is alkaline.

7. The electrical device of claim 3 wherein said electrolyte leakage inhilution means comprises an external resilient annular projection on said grommet compressed between an outwardly direct flange on said closure member and the internal surface of said container.

* * * * *

UNITED STATES PATENT AND TRADEMARK OFFICE
CERTIFICATE OF CORRECTION

PATENT NO. : 4,064,329
DATED : December 20, 1977
INVENTOR(S) : Denis Naylor

It is certified that error appears in the above-identified patent and that said Letters Patent are hereby corrected as shown below:

Column 2, line 48, change ---inhilution--- to "inhibition."

Column 2, line 62, change ---inhilution--- to "inhibition."

Signed and Sealed this

Second Day of May 1978

[SEAL]

Attest:

RUTH C. MASON
Attesting Officer

LUTRELLE F. PARKER
Acting Commissioner of Patents and Trademarks